US009600462B2

(12) United States Patent
Bastide et al.

(10) Patent No.: US 9,600,462 B2
(45) Date of Patent: *Mar. 21, 2017

(54) DYNAMICALLY MANIPULATING TABLES BASED ON A FONT

(71) Applicant: International Business Machines Corporation, Armonk, NY (US)

(72) Inventors: Paul R. Bastide, Boxford, MA (US); Matthew E. Broomhall, Goffstown, NH (US); Robert E. Loredo, North Miami Beach, FL (US)

(73) Assignee: International Business Machines Corporation, Armonk, NY (US)

( * ) Notice: Subject to any disclaimer, the term of this patent is extended or adjusted under 35 U.S.C. 154(b) by 64 days.

This patent is subject to a terminal disclaimer.

(21) Appl. No.: 14/063,048

(22) Filed: Oct. 25, 2013

(65) Prior Publication Data

US 2014/0173403 A1  Jun. 19, 2014

Related U.S. Application Data

(63) Continuation of application No. 13/717,851, filed on Dec. 18, 2012.

(51) Int. Cl.
*G06F 17/24* (2006.01)

(52) U.S. Cl.
CPC .......... *G06F 17/246* (2013.01); *G06F 17/245* (2013.01); *G06F 17/247* (2013.01)

(58) Field of Classification Search
CPC .... G06F 17/245; G06F 17/246; G06F 17/247; G06F 17/30592; G06F 17/30595
See application file for complete search history.

(56) References Cited

U.S. PATENT DOCUMENTS

| 5,598,519 | A | 1/1997 | Narayanan |
| 5,715,413 | A * | 2/1998 | Ishai ............... G06F 3/0481 715/781 |
| 6,613,099 | B2 | 9/2003 | Crim |
| 7,725,498 | B2 * | 5/2010 | Barsness ......... G06F 17/30315 707/803 |
| 2005/0289450 | A1 * | 12/2005 | Bent .............. G06F 17/30554 715/221 |
| 2008/0104498 | A1 | 5/2008 | Molander et al. |
| 2009/0248710 | A1 * | 10/2009 | McCormack ..... G06F 17/30604 |

(Continued)

OTHER PUBLICATIONS

U.S. Appl. No. 13/717,851, filed Dec. 18, 2012 entitled "Improved Table Manipulation".

*Primary Examiner* — Cesar Paula
*Assistant Examiner* — Benjamin Norris
(74) *Attorney, Agent, or Firm* — Jason H. Sosa; John W. Hayes; William H. Hartwell

(57) ABSTRACT

A computer system receives a request to combine tabular data of a first table with tabular data of a second table. The computer system creates a profile for the second table indicating organization of types of data within the second table. The computer system determines a placement for at least one data element of the tabular data of the first table, into the second table, such that the placement agrees, to at least a specified confidence level, with the organization of types of data within the second table indicated by the profile. The computer system adds the at least one data element to the second table based on the determined placement.

8 Claims, 6 Drawing Sheets

(56) References Cited

U.S. PATENT DOCUMENTS

| | | |
|---|---|---|
| 2009/0282324 A1 | 11/2009 | Patel |
| 2011/0055682 A1 | 3/2011 | Friedrich et al. |
| 2012/0016772 A1 | 1/2012 | Sadagaopan et al. |
| 2012/0173226 A1 | 7/2012 | McEvoy et al. |
| 2014/0173402 A1* | 6/2014 | Bastide .................. G06F 17/246 715/219 |

* cited by examiner

DYNAMICALLY MANIPULATING TABLES BASED ON A FONT

CROSS REFERENCE TO RELATED APPLICATION

This application is a continuation of U.S. patent application Ser. No. 13/717,851 filed Dec. 18, 2012 the entire content and disclosure of which is incorporated herein by reference.

FIELD OF THE INVENTION

The present invention relates generally to the field of spreadsheets, and more particularly, to manipulation of tables within a spreadsheet program.

BACKGROUND OF THE INVENTION

A spreadsheet program is an interactive computer application for organization and analysis of information in tabular form. Such information is referred to herein as "tabular data," and is typically represented as data elements organized in an array of vertical columns and horizontal rows (i.e., in a table). The intersection of a column and a row is referred to as a cell. Each cell can contain numeric or text data, or the result of a formula calculated based on contents of other cells. Generally, when copying tabular data from one table to another, or attempting to merge data from two separate tables, a spreadsheet program attempts to insert the data elements from an originating table into a target table, based on the existing arrangement of the data elements within the originating table.

SUMMARY

Embodiments of the present invention include a method, computer program product, and system for combining tabular data. In one embodiment, a computer system receives a request to combine tabular data of a first table with tabular data of a second table. The computer system creates a profile for the second table indicating organization of types of data within the second table. The computer system determines a placement for at least one data element of the tabular data of the first table, into the second table, such that the placement agrees, to at least a specified confidence level, with the organization of types of data within the second table indicated by the profile. The computer system adds the at least one data element to the second table based on the determined placement.

DETAILED DESCRIPTION

Figure 1:
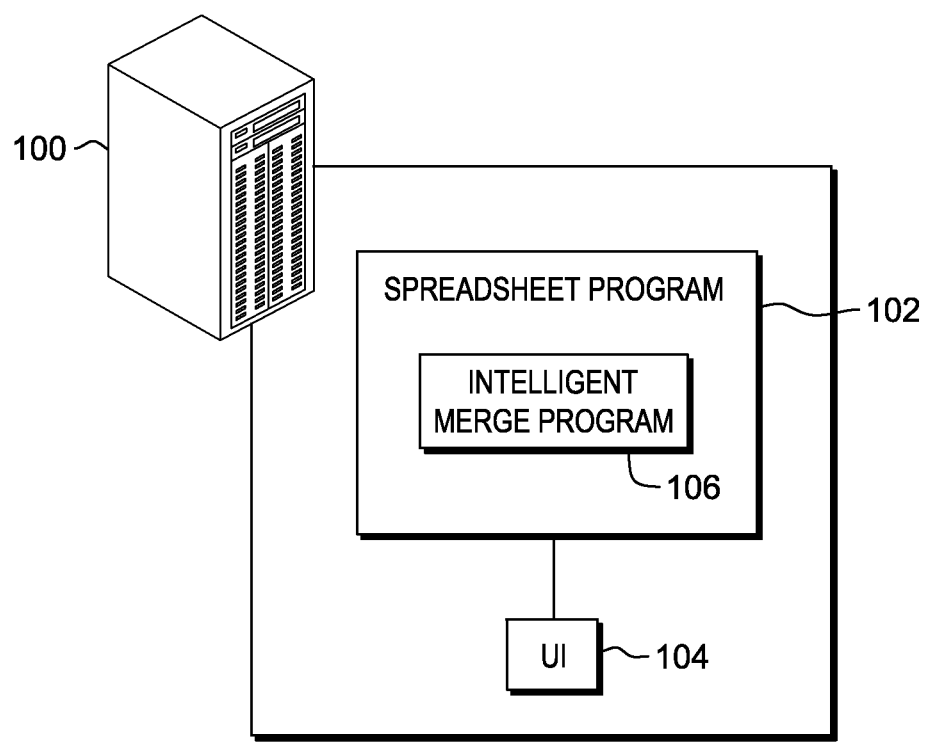
FIG. 1 is a functional block diagram illustrating a data processing system in accordance with one embodiment of the present invention.

Embodiments of the present invention recognize that tabular data representing similar types of information and having similar relationships can be represented in a variety of ways within a table structure. For example, one table may display a first column with each row displaying a number of items purchased by a customer, a second column displaying a price associated with the number of items displayed in the corresponding row of the first column, and a third column displaying a purchase date associated with the number of items displayed in the corresponding row of the first column and the price displayed in the corresponding row of the second column. A second table, however, may have the columns in a separate order. A third table might have similar data transposed so that number of items, price, and purchase data are arranged in rows instead of by columns.

In an attempt to merge such disparate arrangements of tabular data, a user of a spreadsheet program may copy one cell at a time and correctly place it into the arrangement of tabular data in another table. Alternatively, a user may modify the arrangement of one table to match the arrangement of data in another table, and then copy the information. Adding multiple data elements of one table to a second table without observing such painstaking measures may result in an inconsistent relationship between data elements of the rows and data elements of the columns within the table. Additionally, new rows or columns may be mistakenly created, or a table within an existing table may be created. Embodiments of the present invention provide the ability to match types of data between separate tables and to efficiently and accurately combine tabular data from the separate tables.

Implementation of such embodiments may take a variety forms, and exemplary implementation details are discussed subsequently with reference to the Figures.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable media having computer readable program code/instructions embodied thereon.

Any combination of computer-readable media may be utilized. Computer-readable media may be a computer-readable signal medium or a computer-readable storage medium. A computer-readable storage medium may be, for example, but is not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java®, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

FIG. 1 is a functional block diagram illustrating a data processing system, generally designated 100, in accordance with one embodiment of the present invention.

Data processing system 100 may be a desktop computer, laptop computer, a specialized computer server, a client computer, or any other computer system known in the art. In certain embodiments, data processing system 100 may represent a computer system utilizing clustered computers and components to act as a single pool of seamless resources when accessed through a network, as is common in data centers and with cloud computing applications. In general, data processing system 100 is representative of any programmable electronic device or combination of programmable electronic devices capable of executing machine-readable program instructions. Exemplary components of data processing system 100 are described in greater detail with regard to FIG. 6.

Spreadsheet program 102 resides on data processing system 100 and allows for organization and manipulation of information stored in tables. Spreadsheet program 102 may display one or more tables, or portions of one or more tables, and may receive user input via user interface 104. User interface 104 is preferably a graphical user interface.

In one embodiment, intelligent merge program 106 is a subprogram or function of spreadsheet program 102 that merges tabular data of one table with existing data of another table. In an alternate embodiment intelligent merge program 106 may be a distinct program operating on data processing system 100 and interacting with spreadsheet program 102. Intelligent merge program 106 can, in one embodiment, create a table profile for an existing table that indicates an arrangement or organization of data within the existing table. Responsive to an attempt to merge or add tabular data to the existing table, intelligent merge program 106 determines a best fit for the tabular data within the existing table based, at least in part, on the table profile of the existing table. Intelligent merge program 106 may subsequently add or append the tabular data to the existing table according to the determined best fit, or may alternatively present a plurality of possible data combinations and allow the user to select one of the combinations.

Figure 2:
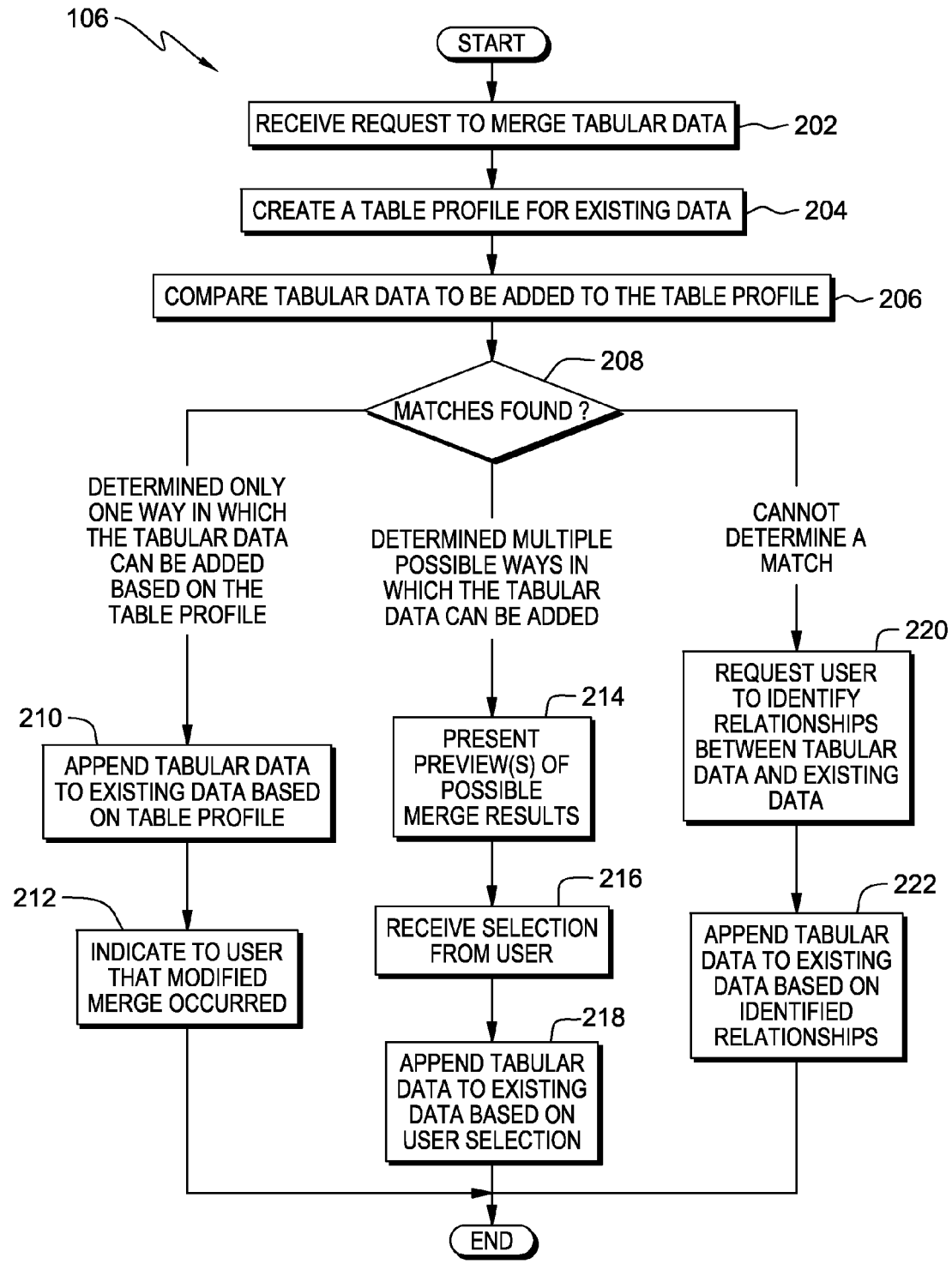
FIG. 2 is a flowchart depicting operational steps of one exemplary implementation of a program for merging tabular data, in accordance with an embodiment of the present invention.

FIG. 2 is a flowchart depicting operational steps of one exemplary implementation of intelligent merge program 106, in accordance with an embodiment of the present invention.

Intelligent merge program 106 receives a request to merge tabular data (step 202) according to embodiments of the present invention. In one embodiment, any attempt to combine tabular data instigates further action by intelligent merge program 106. In a second embodiment, intelligent merge program 106 may receive a specific request to combine tabular data according to embodiments of the present invention. For example, after selecting data sets to combine, spreadsheet program 102 may provide an option to "provide best fit combination," which may trigger operation of intelligent merge program 106. In a third embodiment, intelligent merge program 106 monitors for a trigger event indicating intelligent merge program 106 to combine tabular data according to embodiments of the present invention. Such an implementation is subsequently discussed with respect to FIG. 3.

In one embodiment, upon receiving a request to merge tabular data, intelligent merge program 106 creates a table profile for existing tabular data (step 204) that additional tabular data will be merged with. In another embodiment, a table profile may have been previously created. A table profile provides an indication or description of the way in which a table of data is organized and can take any number of forms. In an exemplary embodiment, intelligent merge program 106 creates a table profile that associates each column and row with any number of descriptive terms or values indicating a type of data within the respective column or row. For example, each column and/or row may be associated with a title or heading. Intelligent merge program 106 may use such a title or heading as one such descriptive term. Descriptive terms or values might additionally or alternatively include one or more of: a font used for a particular row or column, a format used, and a category of data (e.g., number, text, percentage, currency, data, etc.). Determining a category may also take into account different styles (e.g., military vs. standard time) and different geographic specific techniques (e.g., date format in US vs. date format in UK). In an embodiment, intelligent merge program 106 saves the table profile as an associative array or map.

Intelligent merge program 106 compares tabular data, to be added to the existing data, to the table profile of the existing data (step 206) and determines whether the tabular data can be matched to the existing data based on the table profile (decision 208). In one embodiment, intelligent merge program 106 creates a table profile for the tabular data to be added and compares it with the table profile from the existing data. In another embodiment, intelligent merge program 106 may take each data element of the tabular data and determine if the singular data element matches a row or a column from the existing data. In the comparison, a column, row, or data element need not match every association in the table profile of the existing data. For example, a user may attempt to combine tabular data with existing data where the tabular data does not specifically list headers for every column. In such a scenario, header values cannot be matched between the existing data and the tabular data to be added. However, additional matching associations may be sufficient, e.g., font and format of a column, row, or data element may match a corresponding column or row in the existing data. As another example, the category may be the same, but the font may differ or the format may be entered differently (e.g., calendar dates can be written in many different formats). Intelligent merge program 106 may determine a confidence level for a potential match, for example based on the number of matching associations for a column, row, or data element of the tabular data as compared to a column or row of the existing data. Additionally, intelligent merge program 106 may determine multiple potential ways in which the tabular data may be matched to the table profile.

If intelligent merge program 106 determines only one way in which the tabular data can be added to the existing data based on the table profile, for example if only one match is found or only one match exceeds a threshold confidence level, intelligent merge program 106 appends the tabular data to the existing data based on the table profile (step 210). In one embodiment, intelligent merge program 106 may reorganize all the tabular data to match the table profile of the existing data and subsequently append the entirety of the tabular data to the existing data at once. In another embodiment, intelligent merge program 106 may take any subset of the tabular data (e.g., a single column or row, a single data element) and arrange and append the subset of data to the existing data separately. Intelligent merge program 106 may remove redundant headers during this process.

Intelligent merge program 106 may also notify or indicate to a user that a "modified" merge occurred (step 212). For example, if a user performed a "drag and drop" on data of one table into another table, the user might not have expected the reformatting performed by intelligent merge program 106. Intelligent merge program 106 may notify the user of this occurrence, for example, by highlighting the affected data, by sounding an alert, or by providing some other icon, flag, or indication.

Referring back to decision 208, in one embodiment, if intelligent merge program 106 determines that there are multiple possible ways in which the tabular data can be matched to the table profile of the existing data, intelligent merge program 106 may present one or more previews of possible merge results and allow a user to select the correct one (step 214). Intelligent merge program 106 may also display the confidence levels of each potential result. Intelligent merge program 106 receives a selection from the user (step 216) and, based on the user selection, appends the tabular data to the existing data (step 218). In an alternate embodiment, intelligent merge program 106 may merge the data according to the result with the highest confidence level and only present multiple potential results if two or more have, or are near, the same confidence level.

Referring back again to decision 208, if intelligent merge program 106 cannot determine a match, for example if the tabular data cannot be arranged to match the table profile of the existing data above a specified confidence level or alternatively if the table profile cannot be used to distinguish rows and columns (e.g., each data element is a text field of the same format and font), intelligent merge program 106 can request a user to identify relationships or matches between the tabular data and the existing data (step 220). For example, intelligent merge program 106 may highlight a row or column in the existing data and prompt the user to highlight a corresponding row or column from the tabular data. Intelligent merge program 106 may subsequently append the tabular data to the existing data based on relationships identified by the user (step 222).

Figure 3:
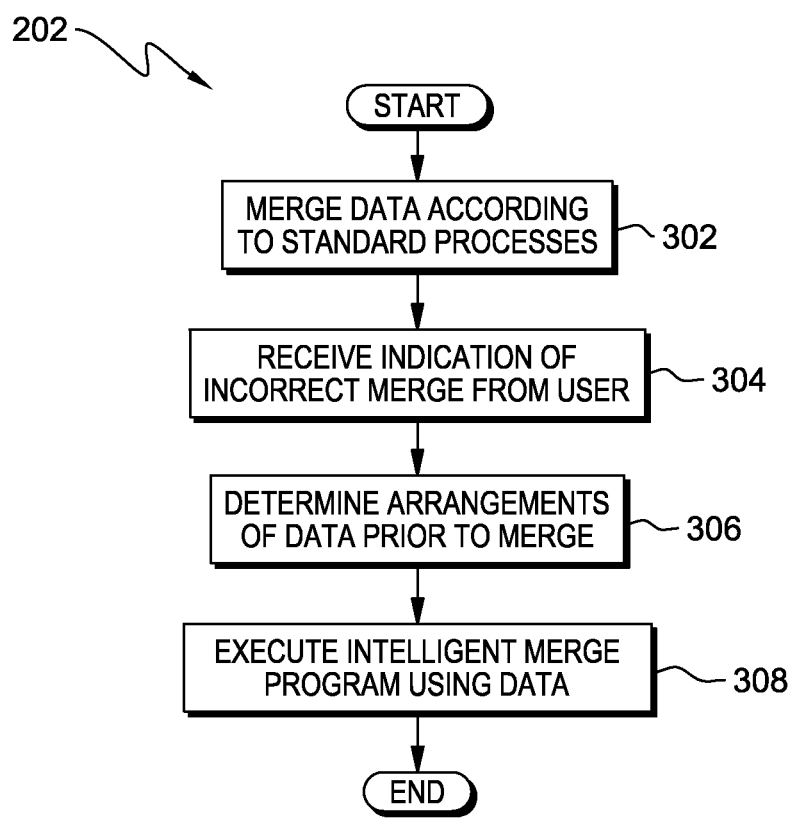
FIG. 3 depicts operational steps of an exemplary implementation for receiving a request to merge tabular data.

FIG. 3 depicts operational steps of an exemplary implementation for receiving a request to merge tabular data by monitoring for a trigger event indicating a user's intention to combine tabular data as discussed with respect to step 202 of FIG. 2.

Intelligent merge program 106 may merge data, or allow data to be merged, according to standard existing processes (step 302). Subsequently, intelligent merge program 106 may receive an indication from the user that the merge or combination of data produced incorrect results (step 304). For example, if a user copies tabular data into an existing table and subsequently realizes that the action did not produce the desired result, the user may signal intelligent merge program 106 to provide results according to embodiments of the present invention. In one embodiment, a user may complete a tactile interaction with a touch screen, e.g., make a "crossing out" motion with a pointer or with a finger on the screen. In another embodiment, the user may select an option such as "undo and perform intelligent merge."

Intelligent merge program 106 determines the previous arrangement of the existing data and tabular data prior to the unsuccessful combination (step 306) and executes an implementation of intelligent merge program 106 (for example, as depicted and discussed with respect to FIG. 2) from the prior data (step 308). In one embodiment, the previous arrangement can be found from a stored history of changes that spreadsheet program 102 maintains to allow changes to be undone and/or from data added to a clipboard for copying.

Figure 4:
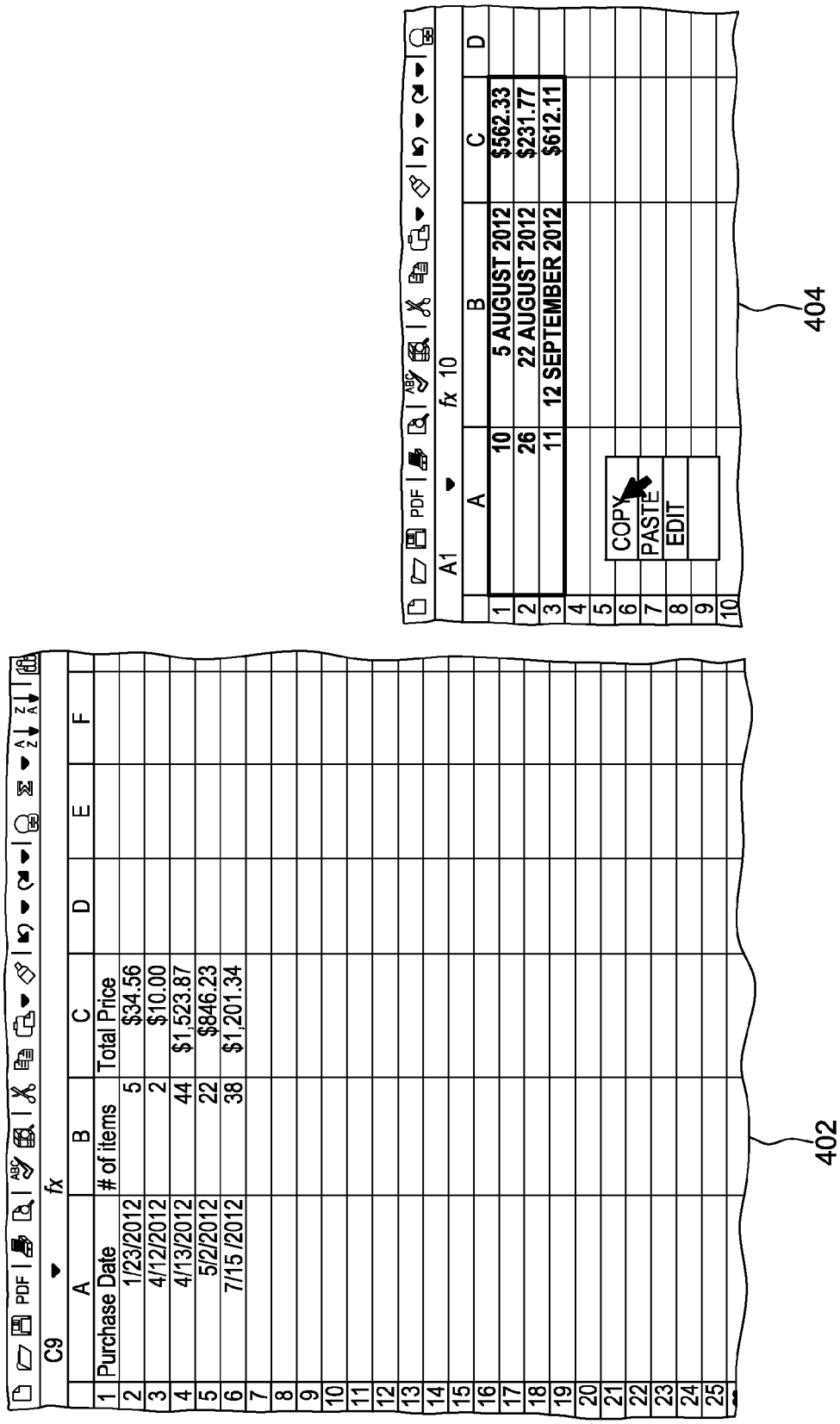
FIG. 4 depicts a first table containing tabular data, and a second table containing tabular data to be combined with the tabular data of the first table.

FIG. 4 depicts a first table, table 402, containing tabular data, and a second table, table 404, containing tabular data to be combined with the existing tabular data of table 402. As depicted, table 402 contains three columns, a first column for purchase dates, a second column for a corresponding number of items purchased, and a third column for a corresponding price. An associative array may be created as a table profile that associates column 1 with the header "Purchase Date," and with the format ##/##/####, and with a category of "calendar date." Column 2 may be associated with the header "# of Items" and the category "number." Column 3 may be associated with the header "Total Price" and the category "currency." If the tabular data in table 404 were copied and added to table 402, intelligent merge program 106 would attempt to match the tabular data to the table profile. In such a scenario, intelligent merge program 106 would not be able to associate any headers to the tabular data of table 404. However, entries in column 1 of table 404 could be associated with "number" and be deemed to potentially match column 2 of table 402 based on the table profile. Column 2 of table 404, while not matching a format of any of the columns or rows of table 402, could be associated with "calendar date" and matched to column 1 of table 402. Column 3 of table 404 could similarly be matched to column 3 of table 402 as "currency." As such, intelligent merge program 106 can rearrange the column order of the tabular data of table 404 to match the order of columns in table 402.

Figure 5:
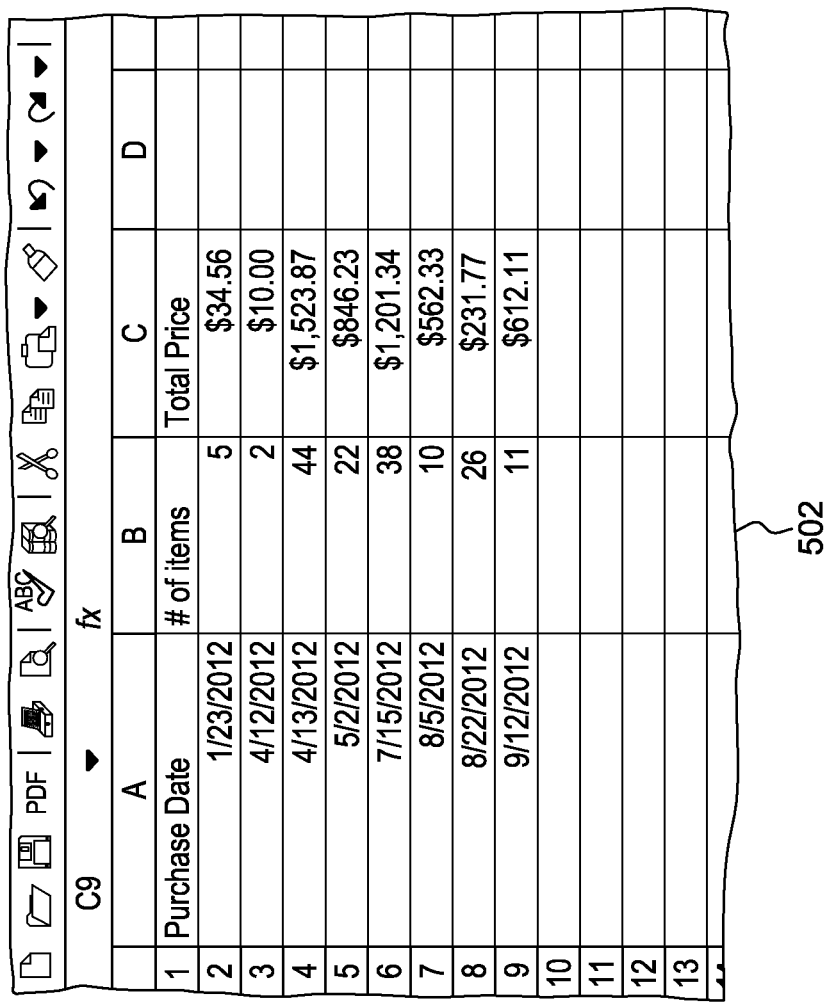
FIG. 5 depicts the resulting combination of the first and second tables of FIG. 4.

FIG. 5 depicts the resulting combination of tables 402 and 404 as discussed with regard to FIG. 4. Amended table 502 has rearranged the column order of table 404 and appended the tabular data to the existing data of table 402. Amended table 502 also depicts the harmonizing of formatting when combining such data, where the formatting of dates in table 404 is altered to match the formatting of dates in the existing table.

Figure 6:
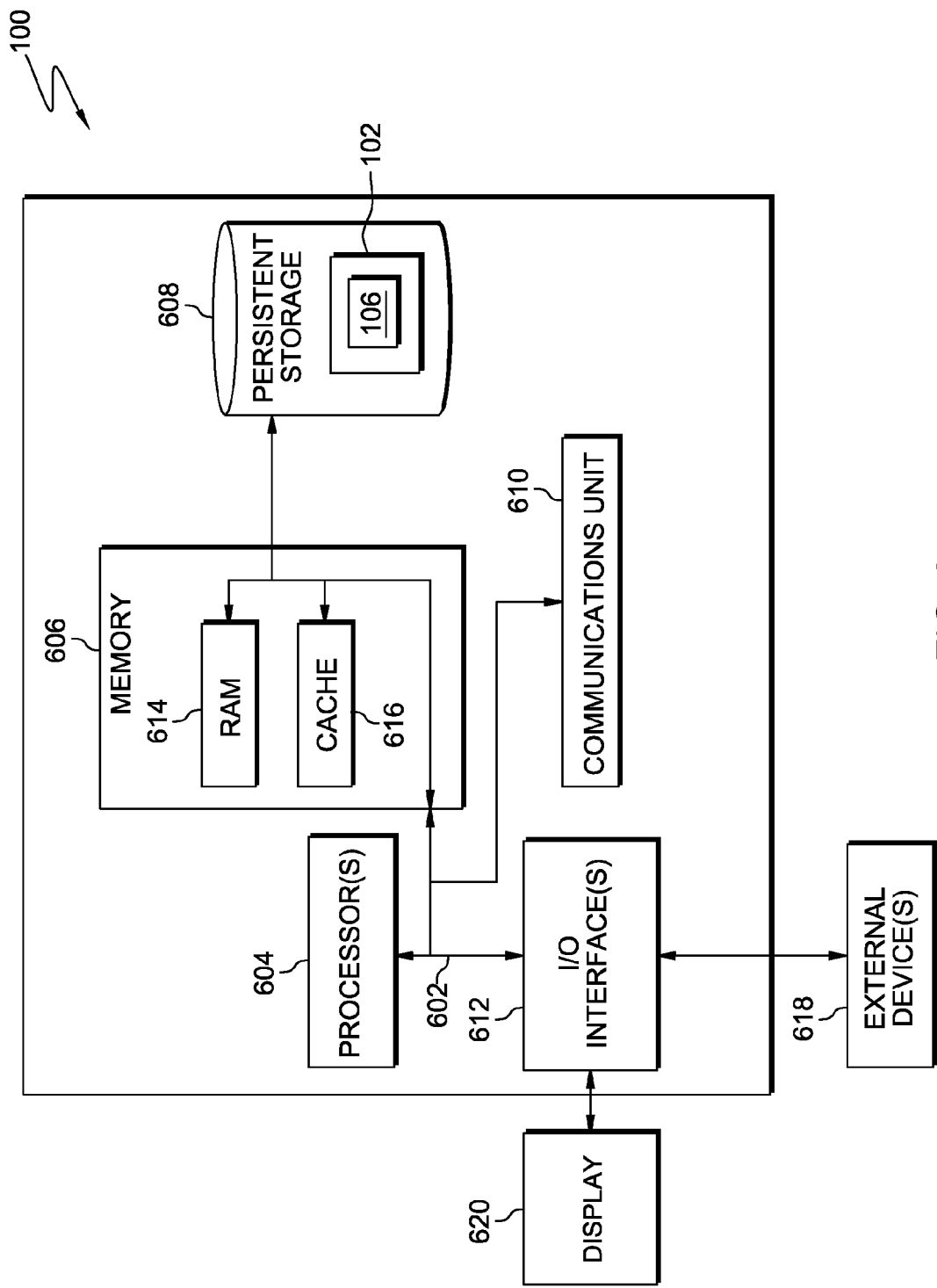
FIG. 6 depicts a block diagram of components the data processing system, in accordance with an illustrative embodiment of the present invention.

FIG. 6 depicts a block diagram of components of data processing system 100, in accordance with an illustrative embodiment of the present invention. It should be appreciated that FIG. 6 provides only an illustration of one implementation and does not imply any limitations with regard to the environments in which different embodiments may be implemented. Many modifications to the depicted environment may be made. For example, data processing system 100 may comprise such components spread through multiple systems and resources and may provide systems and resources beyond what is necessary to operate embodiments of the present invention.

Data processing system 100 includes communications fabric 602, which provides communications between computer processor(s) 604, memory 606, persistent storage 608, communications unit 610, and input/output (I/O) interface(s) 612. Communications fabric 602 can be implemented with any architecture designed for passing data and/or control information between processors (such as microprocessors, communications and network processors, etc.), system memory, peripheral devices, and any other hardware components within a system. For example, communications fabric 602 can be implemented with one or more buses.

Memory 606 and persistent storage 608 are computer-readable storage media. In this embodiment, memory 606 includes random access memory (RAM) 614 and cache memory 616. In general, memory 606 can include any suitable volatile or non-volatile computer-readable storage medium.

Spreadsheet program 102 and intelligent merge program 106 are stored in persistent storage 608 for execution by one or more of computer processors 604 via one or more memories of memory 606. In this embodiment, persistent storage 608 includes a magnetic hard disk drive. Alternatively, or in addition to a magnetic hard disk drive, persistent storage 608 can include a solid state hard drive, a semiconductor storage device, read-only memory (ROM), erasable programmable read-only memory (EPROM), flash memory, or any other computer-readable storage medium that is capable of storing program instructions or digital information.

The media used by persistent storage 608 may also be removable. For example, a removable hard drive may be used for persistent storage 608. Other examples include optical and magnetic disks, thumb drives, and smart cards that are inserted into a drive for transfer onto another computer-readable storage medium that is also part of persistent storage 608.

Communications unit 610, in these examples, provides for communications with other data processing systems or devices, including systems and devices within or controlled by data processing system 100. In these examples, communications unit 610 includes one or more wireless network interface cards. Communications unit 610 may provide communications through the use of either or both physical and wireless communications links. Computer programs and processes, such as spreadsheet program 102 and intelligent merge program 106, may be downloaded to persistent storage 608 through communications unit 610.

I/O interface(s) 612 allows for input and output of data with other devices that may be connected to data processing system 100. For example, I/O interface 612 may provide a connection to external devices 618 such as a keyboard, keypad, a touch screen, and/or some other suitable input device. External devices 618 can also include portable computer-readable storage media such as, for example, thumb drives, portable optical or magnetic disks, and memory cards. Software and data used to practice embodiments of the present invention can be stored on such portable computer-readable storage media and can be loaded onto persistent storage 608 via I/O interface(s) 612. I/O interface(s) 612 may also connect to a display 620.

Display 620 provides a mechanism to display data to a user and may be, for example, a touch screen or a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer-implemented method for combining tabular data, the method comprising the actions of:
   receiving a request to combine tabular data of a first table with tabular data of a second table;
   creating a profile for the second table indicating organization of types of data within the second table, wherein the profile associates each data element of the second table with descriptive values including at least a font used for a particular column or row of the second table;
   determining, by one or more computer processors, a placement for at least one data element of the tabular data of the first table, into the second table, such that the placement agrees, to at least a specified confidence level, with the organization of types of data within the second table as indicated by the descriptive values of the profile;
   automatically rearranging, by one or more processors, the tabular data of the first table to match the profile of the tabular data of the second table according to the organization of types of data within the second table, such that a rearranged column or row of the first table aligns with a placement of the particular column or row of the second table based on a font;
   displaying the rearranged tabular data of the first table; and
   subsequent to receiving an indication of a profile of the rearranged tabular data of the first table matches the profile of the second table, adding the at least one data element to the second table based on the determined placement, wherein a font of the at least one data element matches a font of a particular column or row of the determined placement.

2. The method of claim 1, wherein said creating the profile for the second table indicating the organization of types of data within the second table comprises:
   associating each of a plurality of the columns and rows in the second table with one or more attributes indicative of a type of data for the respective column or row.

3. The method of claim 1, wherein said determining the placement for the at least one data element of the tabular data of the first table, into the second table comprises:
   determining one or more attributes of the at least one data element;
   determining a column or row of the second table that is associated with one or more of the one or more attributes, based on the profile; and
   determining to place the at least one data element in the determined column or row of the second table.

4. The method of claim 3, further comprising:
   prior to determining to place the at least one data element in the determined column or row of the second table:
   determining a second column or row of the second table that is associated with one or more of the one or more attributes;
   indicating to a user that the at least one data element can be placed in both the determined column or row and the second column or row; and
   receiving a selection of the determined column or row from the user.

5. The method of claim 4, wherein said indicating to the user comprises:
   displaying a preview of the at least one data element placed into the determined column or row; and
   displaying a preview of the at least one data element placed into the second column or row.

6. The method of claim 1, further comprising:
   indicating to a user that the at least one data element has been added to the second table based on the profile of the tabular data of the second table.

7. The method of claim 1, further comprising:
   prior to said determining the placement for the at least one data element of the tabular data of the first table, into the second table, receiving an indication from a user that a previous combination of the tabular data of the first table with the tabular data of the second table produced incorrect results.

8. The method of claim 1, further comprising:
   prior to said determining the placement for the at least one data element of the tabular data of the first table, into the second table, receiving, from a user, an indication of how tabular data of the first table corresponds to tabular data of the second table.

* * * * *